United States Patent [19]
Kern et al.

[11] Patent Number: 5,947,313
[45] Date of Patent: Sep. 7, 1999

[54] MOLDED PLASTIC BASKET AND REAR PANEL FOR SHOPPING CART

[75] Inventors: Alan Roger Kern; Christopher Michael Johnson; Scottlan Ray Henry, all of Richmond, Va.

[73] Assignee: Rehrig International, Inc., Richmond, Va.

[21] Appl. No.: 09/071,597

[22] Filed: May 4, 1998

Related U.S. Application Data

[60] Provisional application No. 60/045,562, May 5, 1997.

[51] Int. Cl.$^6$ .................................................... B65D 19/00
[52] U.S. Cl. .................... 220/4.01; 220/668; 220/676; 220/659; 280/33.991; 280/DIG. 4
[58] Field of Search ..................... 220/4.01, 9.4, 220/668, 676, 659; 280/33.991, 33.998, DIG. 4

[56] References Cited

U.S. PATENT DOCUMENTS

| | | |
|---|---|---|
| D. 155,971 | 8/1948 | Concklin . |
| D. 156,701 | 3/1948 | Concklin . |
| D. 156,702 | 6/1948 | Concklin . |
| D. 301,076 | 5/1989 | Yoshikawa . |
| 2,527,953 | 4/1947 | Muffley . |
| 2,906,542 | 6/1957 | Hoedinghaus et al. . |
| 3,346,271 | 7/1965 | Parsons . |
| 3,478,914 | 11/1969 | Williams ................................ 220/668 |
| 3,502,204 | 3/1970 | James ..................................... 220/668 |
| 3,999,774 | 12/1976 | Rehrig . |
| 4,273,346 | 6/1981 | Rehrig . |
| 4,632,411 | 12/1986 | Badger . |
| 4,650,199 | 3/1987 | Rehrig . |
| 5,058,747 | 10/1991 | Decroix et al. ........................ 220/668 |
| 5,255,930 | 10/1993 | Jones et al. . |
| 5,441,288 | 8/1995 | Rehrig . |
| 5,458,347 | 10/1995 | Chiv . |

FOREIGN PATENT DOCUMENTS

| | | |
|---|---|---|
| 137669 | 11/1996 | Spain . |
| 688130 | 2/1953 | United Kingdom . |

*Primary Examiner*—Joseph M. Moy
*Attorney, Agent, or Firm*—Bacon & Thomas, PLLC

[57] ABSTRACT

A molded plastic basket for a shopping cart includes side and front walls formed of a molded gridwork of ribs extending at an angle relative to the upright direction of the basket when it is assembled to a shopping cart chassis. The front and side walls intersect each other along convex arcuate curved corner sections with the gridwork ribs continuously flowing around the corner sections up to a mold parting line provided midway around the curved sections. The ribs of the side walls extend parallel to each other to permit molding of the side walls by a transversely moveable mold section that moves towards and away from the side wall area during molding and the ribs of the front wall likewise all extend parallel to each other in a direction generally perpendicular to the direction of the side wall ribs to enable molding of the ribs of the front wall by another moveable section of a mold that moves in a direction generally perpendicular to the direction of motion of the mold section forming the side walls. The gridwork ribs come together along the mold part lines to provide an attractive appearance.

16 Claims, 10 Drawing Sheets

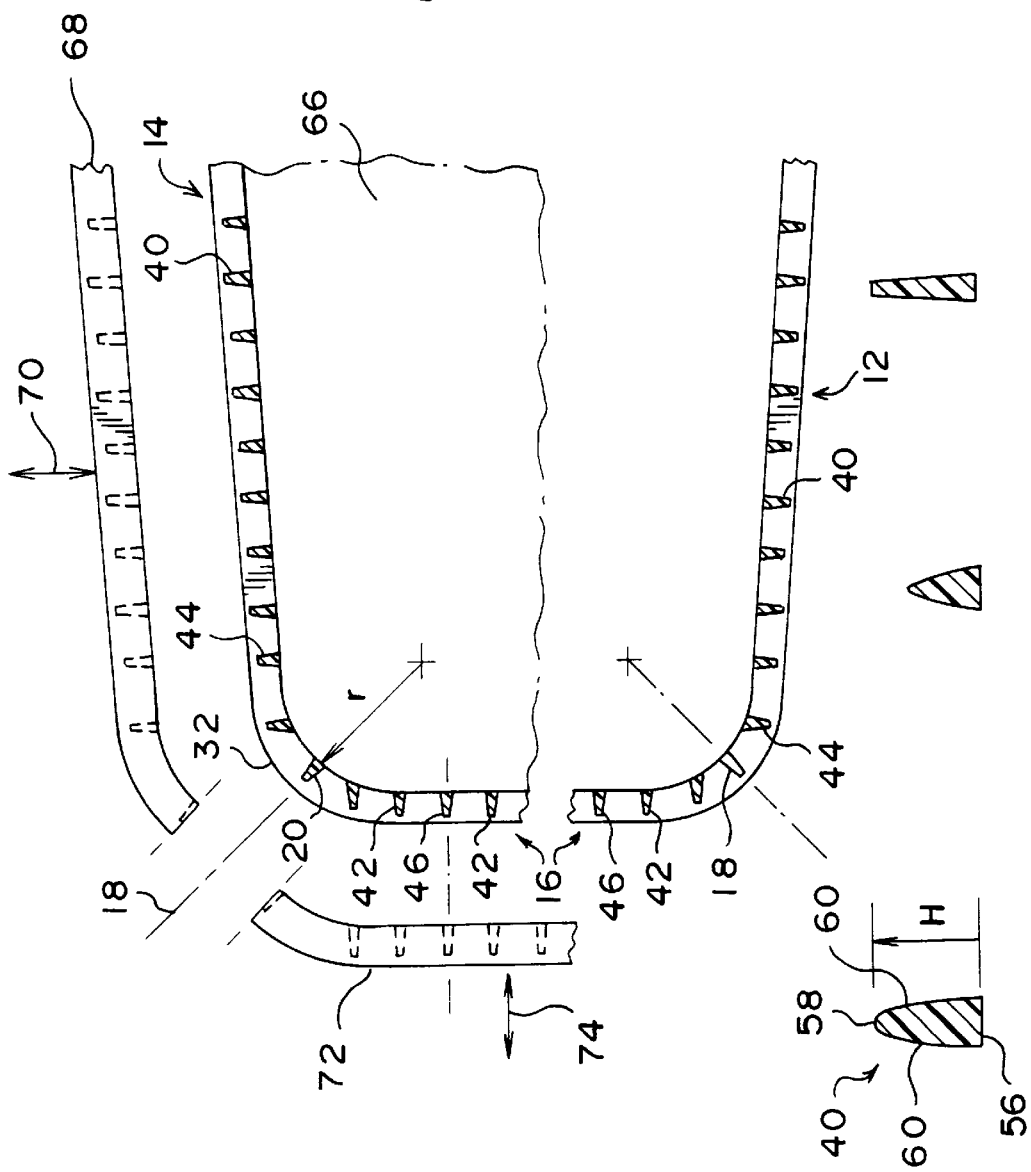

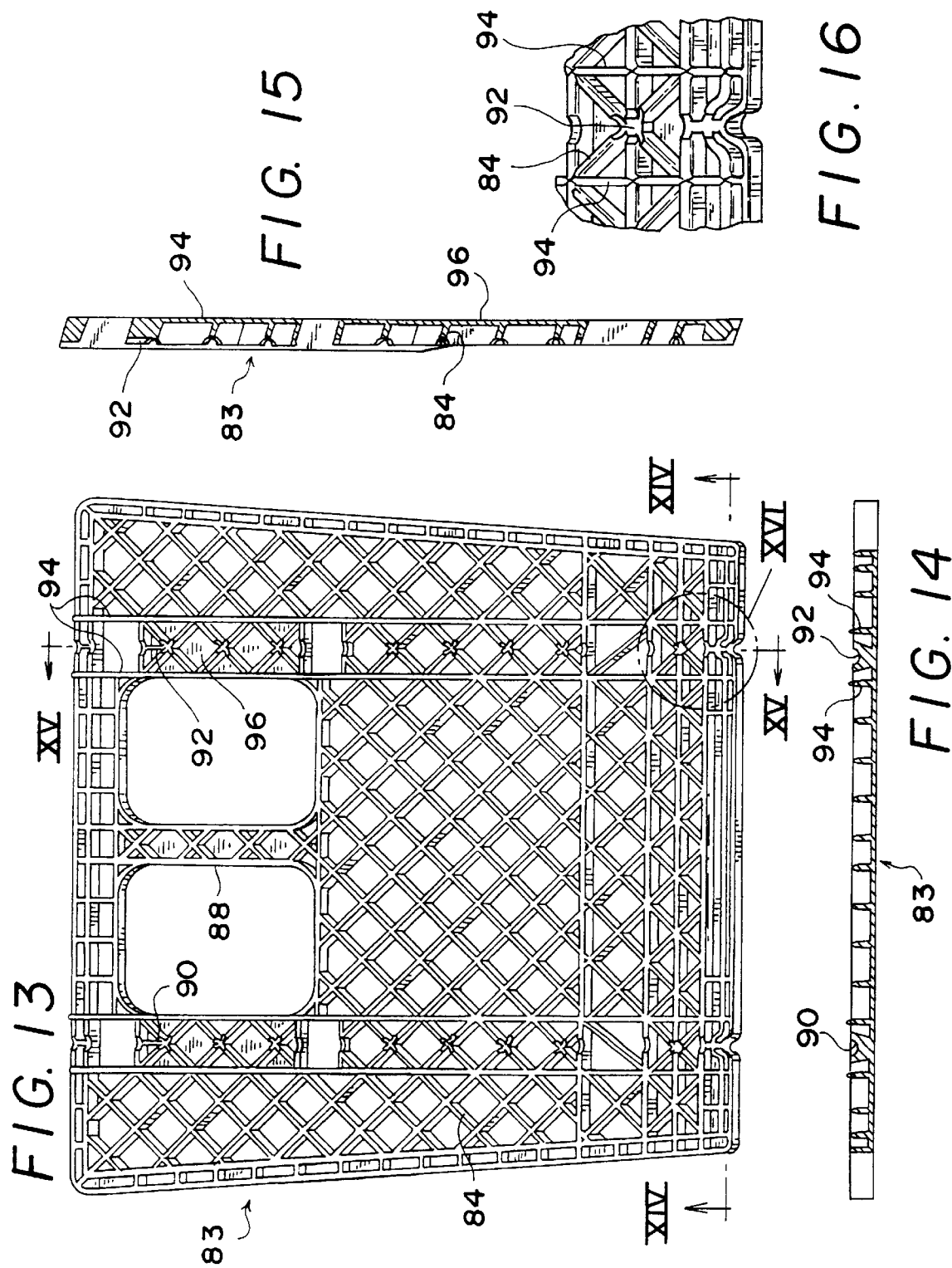

MOLDED PLASTIC BASKET AND REAR PANEL FOR SHOPPING CART

This application claims the benefit of provisional application No. 60/045,562 filed May 5, 1997.

BACKGROUND OF THE INVENTION

A. Field of the Invention

This invention is a molded plastic basket and rear panel for a shopping cart, in particular a basket for a nestable shopping cart including a wheeled chassis.

B. Related Art

Molded plastic baskets and rear panels for shopping carts have been described in the patent literature, for example U.S. Pat. No. 5,458,347 granted to Chiv Oct. 17, 1995; U.S. Pat. No. 4,273,346 granted to Rehrig Jun. 16, 1991; U.S. Pat. No. 4,632,411 granted to Badger Dec. 30, 1996; U.S. Pat. No. 3,999,774 granted to Rehrig Dec. 28, 1976 and U.S. Pat. No. 4,650,199 granted to Rehrig Mar. 17, 1987.

Molding of the basket and rear panel portions of plastic shopping carts is typically carried out using injection or compression molding techniques using outer moveable mold sections that cooperate with an inner core to mold the entire basket and, if desired, rear panel in a one shot molding process. When the basket is formed of a gridwork of narrow yet relatively tall ribs, it will be appreciated that molding problems may be encountered if the ribs run other than perpendicular to the upright and longitudinal directions of the basket, and if the basket has curved corner sections. If the ribs run at an angle, for example, of 45°, the front corner portions of the basket need to be configured so that the vertically moveable molds used to form the side and front walls of the basket can be removed after the molding operation to release the molded gridwork.

Due to molding requirements, the front corner portions of plastic baskets for shopping carts are typically molded in substantially square configuration or with a special grid formation that ensures moldability at the corner sections. In particular, the corner sections of the basket must be configured such that the molds forming the sides of the basket can move away from the sides after molding and the mold forming the front of the basket also can move away from the front molded section as well. In a conventional molding system, the side and front mold sections move approximately at right angles relative to each other.

If it is desired to form the front corners of the molded plastic basket with an arcuate convex configuration while preserving the appearance of a 45° gridwork as it traverses the rounded portion, the molding problem becomes acute as the mold parting line is approached in the front corner areas of the basket. Conventionally, the mold parting line is located at the front corner zones of the basket where the mold side sections join the front mold section when the mold is fully closed. It has been discovered that an attempt to simply contour the gridwork ribs around the arcuate front corner sections of the basket results in a widening of the inner edges of the ribs forming the gridwork of the front and side walls of the basket as the parting line of the mold is approached. Accordingly, the present invention addresses the problem of providing an attractive, unique appearance for a plastic shopping cart basket having a non-upright gridwork of ribs forming the basket side and front walls, namely rounded front corner profiles, while maintaining a uniform appearing gridwork of the ribs as the ribs traverse the rounded front corner sections of the basket adjacent the mold parting line.

BRIEF SUMMARY OF THE INVENTION

This invention concerns a basket for a shopping cart comprising injection or compression molded upright longitudinally extending opposed side walls of plastic material integrally joined by molding to oppose ends of a transverse extending upright front wall of molded plastic material along upright mold parting lines. The side and front walls are formed of a gridwork of equally spaced, mutually perpendicular intersecting gridwork ribs extending along their lengths at approximately 45° relative to the normal upright direction of the side and front walls, with the heightwise direction of the ribs extending generally perpendicular to the respective side and front walls.

The side walls include planar sections intersecting at their forward ends convex circular curved front end sections that terminate at the mold parting lines and the front wall has a planar central section intersecting at each end thereof convex circular curved end sections which also terminate at the mold parting lines. The ribs of the gridwork are generally trapezoidal shaped in cross section, including a generally planar inner edge facing towards the inside of the basket with a given width; and an outer tip spaced heightwise from the inner edge preferably extending across a shorter width dimension than the inner ridge, with laterally spaced, converging, generally planar side walls extending heightwise of the ribs between the inner edge and the tip of each rib.

The gridwork rib inner edges collectively form the inner surfaces of the side and front walls of the basket and the tips of the gridwork ribs collectively form the outer surfaces of the side and front walls. At least the tips of the gridwork ribs of the front and side walls intersect each other along the mold parting lines to present an appearance of continuity of rib projections across the front and side walls of the basket.

The gridwork ribs in cross section each include a major height axis extending heightwise between the inner edge and the outer tip of the rib along a plane preferably bisecting the inner edge and the outer tip, such plane extending lenghtwise of the rib. Typically the gridwork ribs are symmetrical on either side of said plane and the inner edge of the ribs extend generally normal to the bisecting plane.

The inner edges of the ribs have uniform width throughout their lengths up to the mold parting line and the ribs preferably have uniform cross section throughout their length, except that the heights of the ribs may vary along their lengths.

The major height axes of the gridwork ribs of the front wall all extend parallel to each other and, likewise, the major height axes of the gridwork ribs of the opposed side walls all extend parallel to each other and perpendicular to the major height axes of the gridwork ribs of the front wall throughout the lengths of the gridwork ribs.

In a preferred embodiment, the radii of curvature and arc lengths of the circular curved front end sections of the side walls and the circular curved end sections of the front wall are equal.

In a preferred embodiment, the lengths of the major height axes of the gridwork ribs may vary in a symmetrical fashion such that the heights of some ribs are greater than other ribs in the planar sections of the side and front walls. However, all of the ribs have the same height along the mold parting lines to provide a smooth intersection of the tips of the ribs along the mold parting lines and smooth interior side and front wall surfaces. In such preferred embodiment, the heights of the taller ribs gradually diminish to match the heights of the shorter ribs as the mold parting line is approached by all of the ribs. The inner edges of all the ribs on the inside of the basket present a smooth gridwork surface.

In a preferred embodiment, additional upright ribs are provided along the mold parting lines such that the gridwork ribs intersect the parting line ribs along the mold parting lines. Also, in accordance with a preferred embodiment, upright extending end ribs may be located on each side of the front and side walls at the intersection of the planar sections of each respective wall and the convex curved end sections of each wall, with the gridwork ribs intersecting the end ribs.

The present invention also includes a rear panel for closing the rear open end of the molded basket when the basket is fully assembled on a shopping cart chassis, and a molded, reinforced bottom wall for the basket.

Various configurations of gridwork rib contours are used for the rear panel and the bottom wall of the basket for both structural and aesthetic effects. In particular, the sloping gridwork of ribs is preserved generally throughout the rear panel while appropriate reinforcement ribs and openings are provided to enhance the structural rigidity of the rear panel.

BRIEF DESCRIPTION OF THE DRAWINGS

The invention will be more fully understood with reference to the appended drawings and the following detailed description.

In the drawings:

FIG. 7 is a schematic illustration of how the gridwork ribs are molded by using moveable mold sections;

FIGS. 8(a)–(d) illustrate various rib cross-sectional configurations that may be utilized for the gridwork ribs, the cross-sections being taken along exemplary section lines VIII—VIII in FIG. 6;

FIG. 13 is a rear elevation view of a molded rear panel for the plastic basket shown in FIG. 1;

FIG. 14 is transverse sectional view taken along line XIV—XIV in figure 13;

FIG. 15 is a vertical section view taken along line XV—XV in FIG. 13;

FIG. 16 is an enlarged detail view of the portion identified by numeral XVI—XVI in FIG. 13.

DETAILED DESCRIPTION OF PREFERRED EMBODIMENTS OF THE INVENTION

Figure 1:
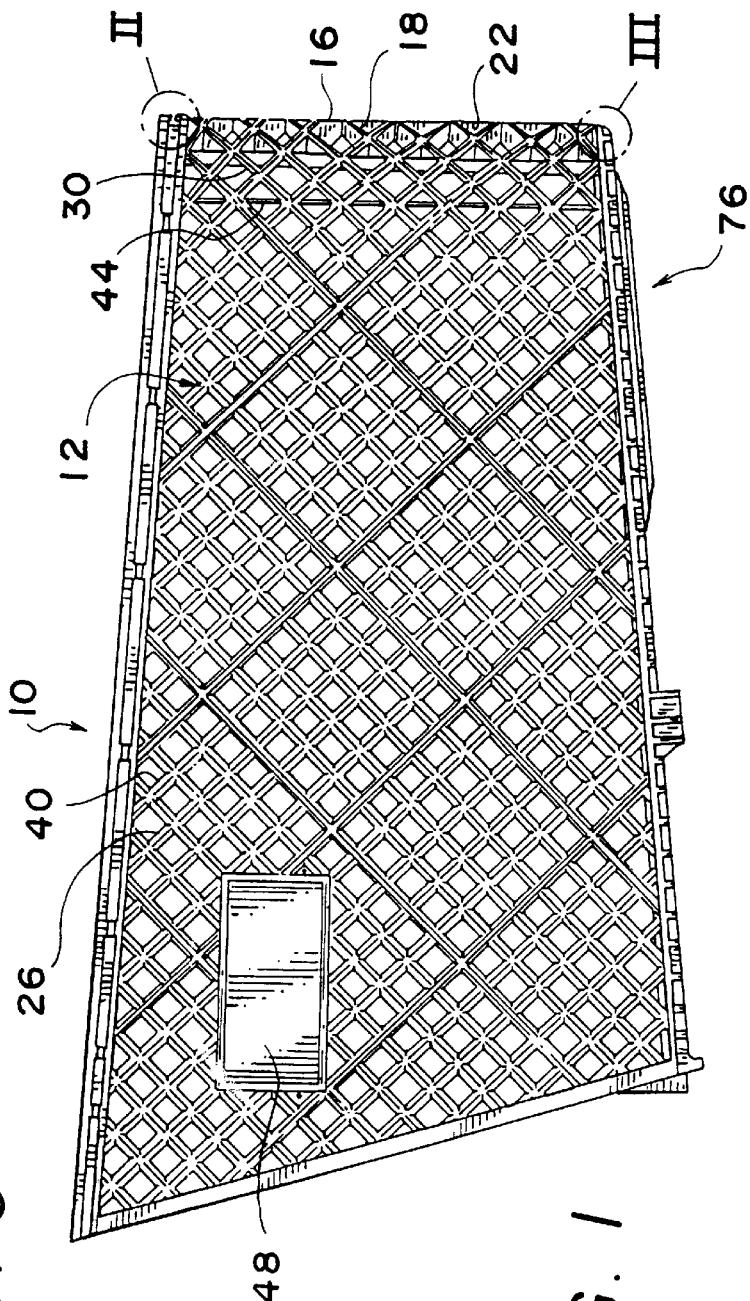
FIG. 1 is a side elevational view of a preferred embodiment of a molded plastic basket for a shopping cart embodying the invention, the basket being depicted in its normal upright position when mounted on a shopping cart chassis.
Figure 2:
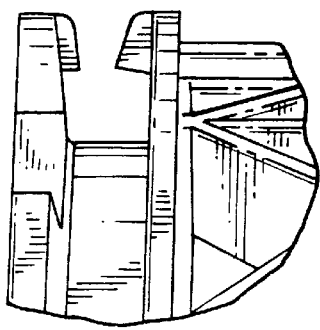
FIGS. 2 and 3 are enlarged detailed views of sections identified by the numerals II and III in FIG. 1, respectively.
Figure 3:
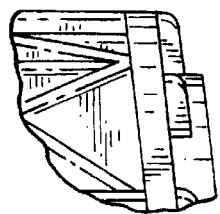
Figure 4:
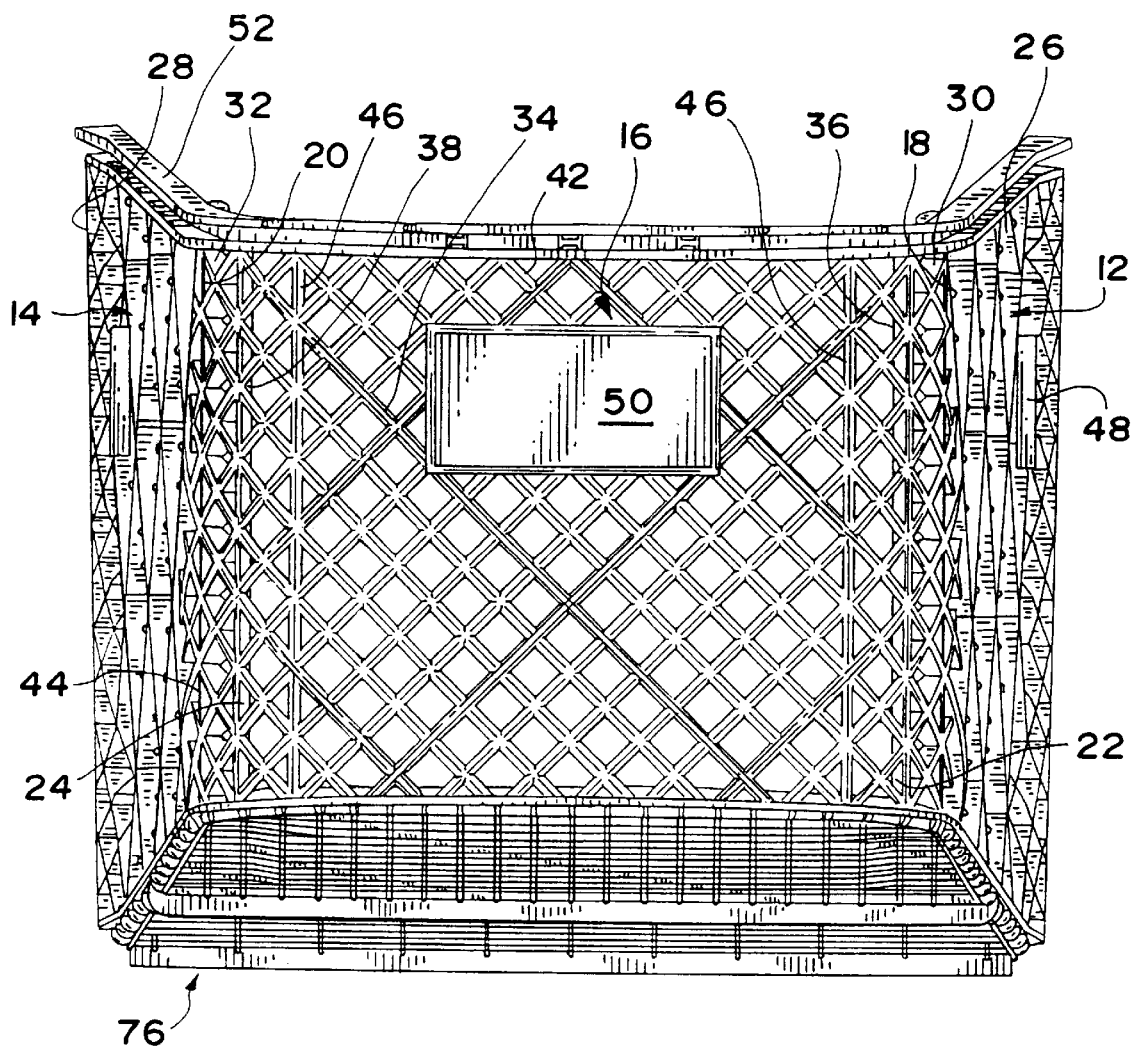
FIG. 4 is a front elevational view thereof.
Figure 5:
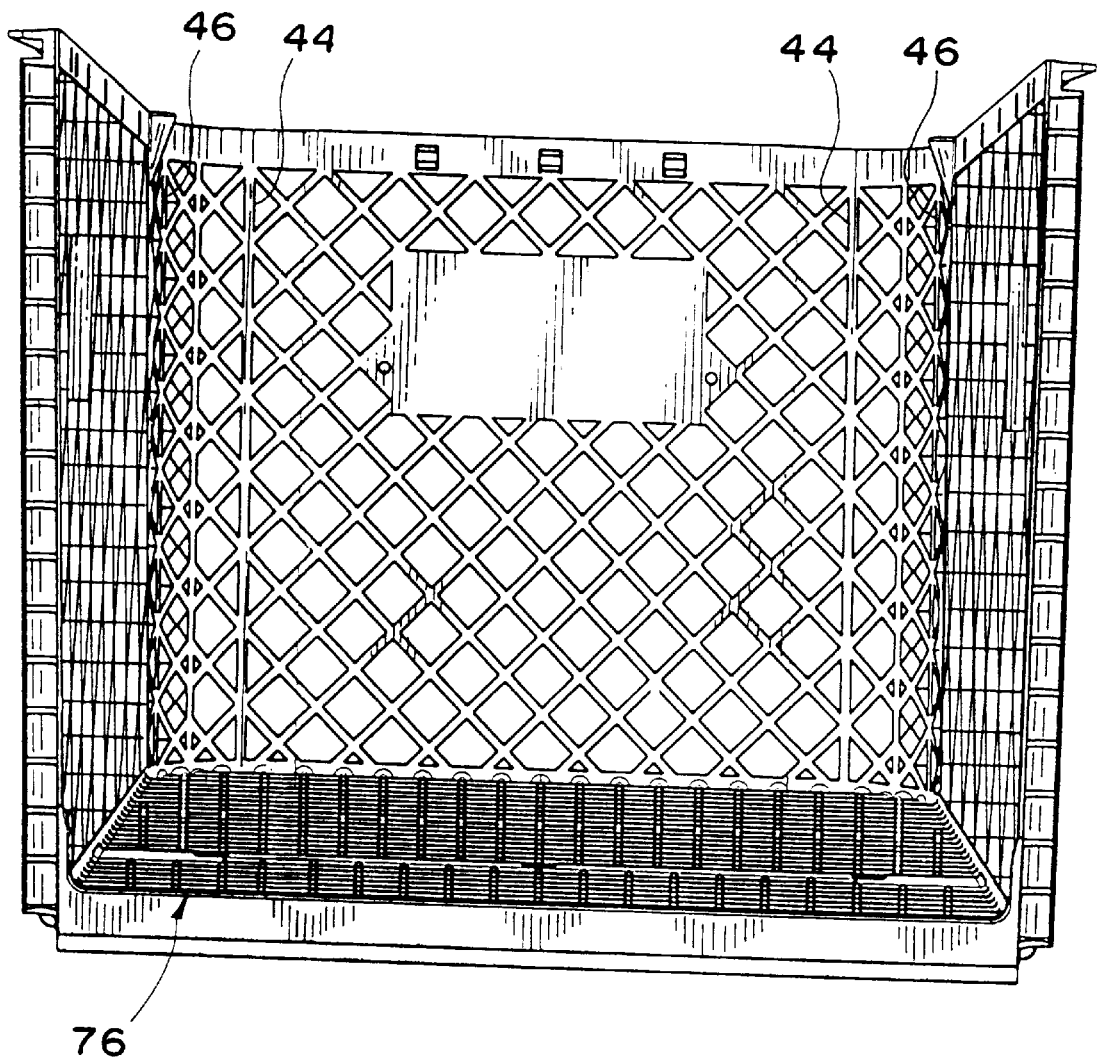
FIG. 5 is a rear elevational view thereof.
Figure 6:
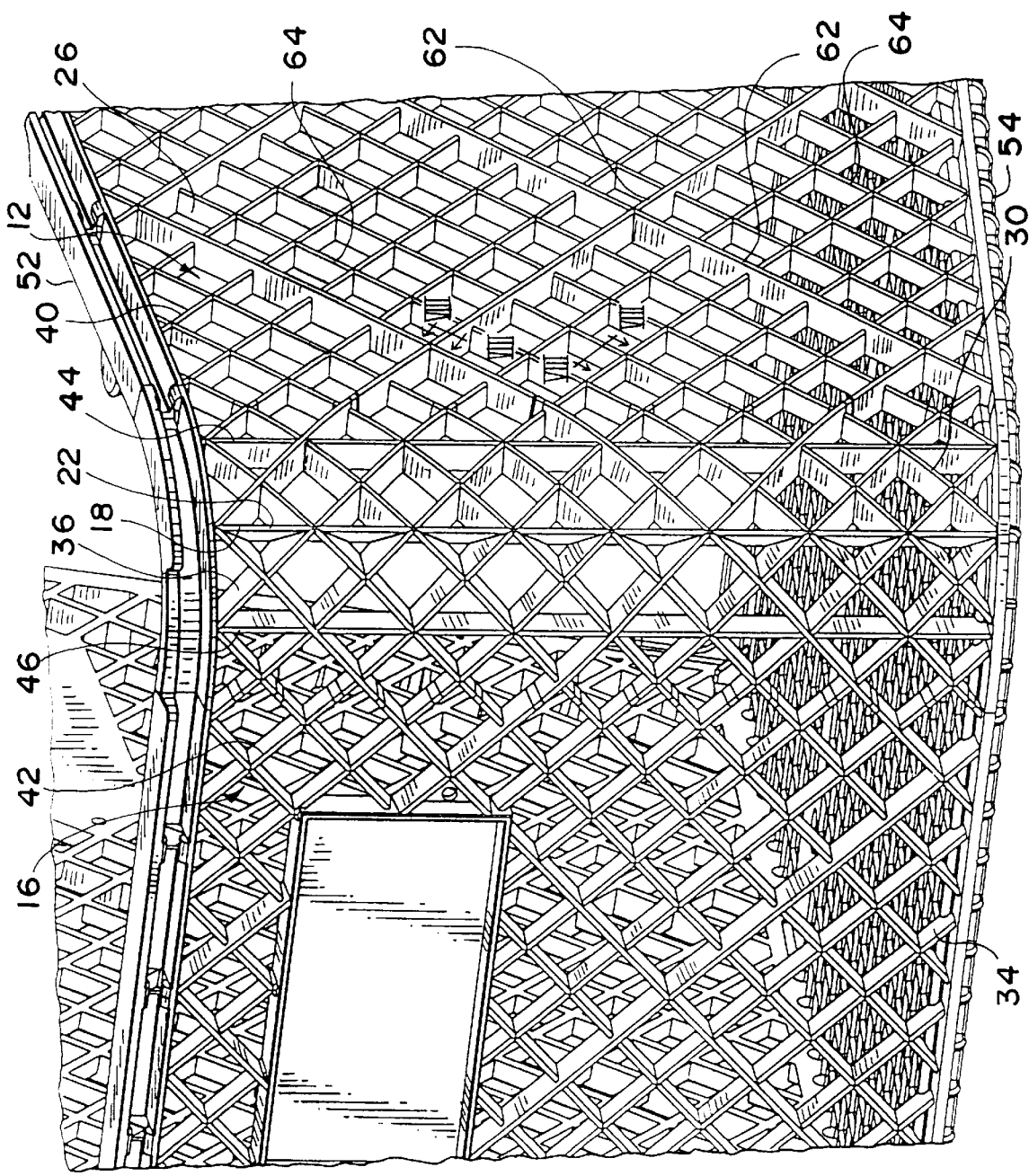
FIG. 6 is an enlarged elevation perspective view of a corner section of the molded plastic basket shown in FIG. 1.

With reference to the appended drawings, a molded plastic basket for a shopping cart is shown in FIG. 1 in it's normal, upright position of use when it is installed on a chassis of a shopping cart (not shown), for example, the type of wheeled chassis illustrated in the U.S. patents referred to in the discussion of related art above. The basket is shown in a side view in FIG. 1, while FIGS. 4 and 5 respectively show the basket from front and rear perspectives. FIG. 6 can be referred to for an enlarged illustration of the front rounded corner detail of the basket.

The basket includes longitudinally extending opposed side walls 12,14 and a front wall 16 integrally joined together by molding along upright mold parting lines 18,20. Upright molded parting line ribs 22,24 extend along the mold parting lines 18,20 in a preferred embodiment of the invention.

Each side wall 12,14 includes a planar section 26,28 and integral connected convex circular curved front end sections 30,32 terminating at the mold parting lines 18,20.

The front panel 16 includes a planar central section 34 intersecting integrally connected convex circular curved end sections 36,38 terminating respectively at mold parting lines 18,20.

The side walls 12,14 and the front wall 16 are formed from a gridwork of molded plastic gridwork ribs including side wall gridwork ribs 40 and front wall gridwork ribs 42. The ribs in the preferred embodiment are equally spaced, mutually perpendicular intersecting ribs extending generally and approximately 45° long their lengths relative to the upright direction of the side and front walls 12,14.

End ribs 44,46 are provided at the juncture of the planar sections 26,28 of the side walls and the convex curved end sections 30,32 of the side walls, and at the intersection of the planar section 34 of the front wall and the convex curved end sections 36,38 of the front wall, respectively.

It will be observed that the gridwork ribs 40 of the side walls intersect the upright end ribs 44 of the side walls and are configured to appear continuous along their lengths on either side of the end ribs 44. Likewise, the gridwork ribs 42 of the front wall 16 intersect the end ribs 46 and continue along their lengths on either side of the ribs 46 in a continuous manner.

Solid molded plastic advertising or logo panels 48,50 may be provided optionally on the side and front walls of the basket, respectively. The gridwork ribs do not extend through the panels 48,50, which present a smooth surface on the interior of the basket with the gridwork rib inner edges.

As best seen in FIG. 6, the gridwork ribs of the convex curved end sections of the side walls and the front wall terminate at the parting line rib 22 with the tips of the ribs intersecting along the mold parting line 18, or, more particularly, along the mold parting line rib 22. The gridwork ribs 40,42 of the side and front walls, respectively, appear to extend continuously without interruption, at least along their tips, around the convex circular curved end sections 30,32, 36,38 until the gridwork ribs in the curved sections reach their terminus at rib 22, the upper edge 52 of the basket or the lower bottom edge 54 of the basket.

All of the gridwork ribs constituting the planar and curved portions of the side and front walls preferably have a cross section as shown in one of the views constituting FIG. 8 of the drawings. FIG. 8(a), for example, shows a generally trapezoidal shaped rib including a generally planar inner edge 56 having a given width across the inner edge extending from left to right as viewed in FIG. 8(a). The gridwork rib includes an outer tip 58 spaced heightwise (in the direction indicated by arrow H in FIG. 8(a)) from the inner edge and which extends widthwise across a shorter width dimension than the inner edge. The rib shown in FIG. 8(a) also includes spaced, converging, generally planar side walls 60 extending heightwise between the inner edge 56 and the tip 58. The height of the rib may vary within the gridwork constituting the side and fronts walls of the basket and a gridwork rib 40 having a shorter height is shown in FIG. 8(b). While FIGS. 8(a) and (b) show preferred embodiments of the gridwork ribs 40 and 42, other configurations such as shown in FIG. 8(c) and (d) could be utilized for the gridwork ribs. In general, the gridwork ribs preferably are longer or taller in height than in width and tapper inwardly from the inner edge to the tip to permit release of the mold following a molding operation. The rib inner edges 56 should be smooth and generally planar since they effectively form the inner surfaces of the side and front walls of the basket. The tips 58 should be smooth and present a pleasing appearance and safe contour because they will constitute the effective outer surface of the basket side and front walls.

As shown in FIG. 6, it is desirable to include taller and shorter ribs at periodic intervals across the gridwork to provide a textured appearance which is aesthetically pleasing. However, all of the gridwork ribs of the side walls and the front wall are the same height where they intersect the mold parting line 18 or the parting line rib 22. As shown in FIG. 6, taller ribs 62 may be interspersed with shorter ribs 64, yet the height of the taller ribs 62 gradually diminishes as they approach the parting line rib 22 so that the tips of all the gridwork ribs are of uniform height where they intersect the parting line 18 or parting line rib 22.

Figure 9:
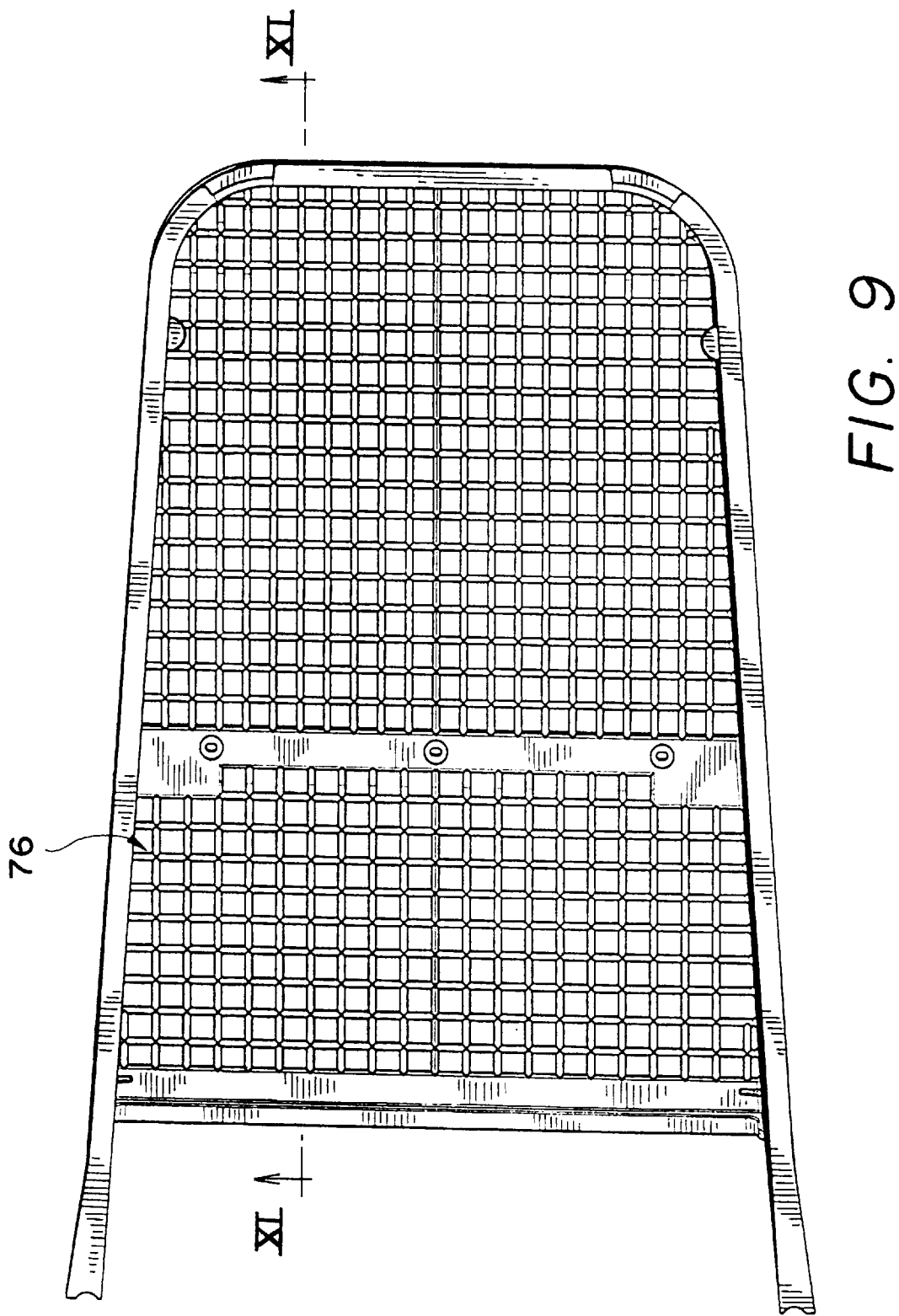
FIG. 9 is top plan view of the molded basket shown in FIG. 1.
Figure 10:
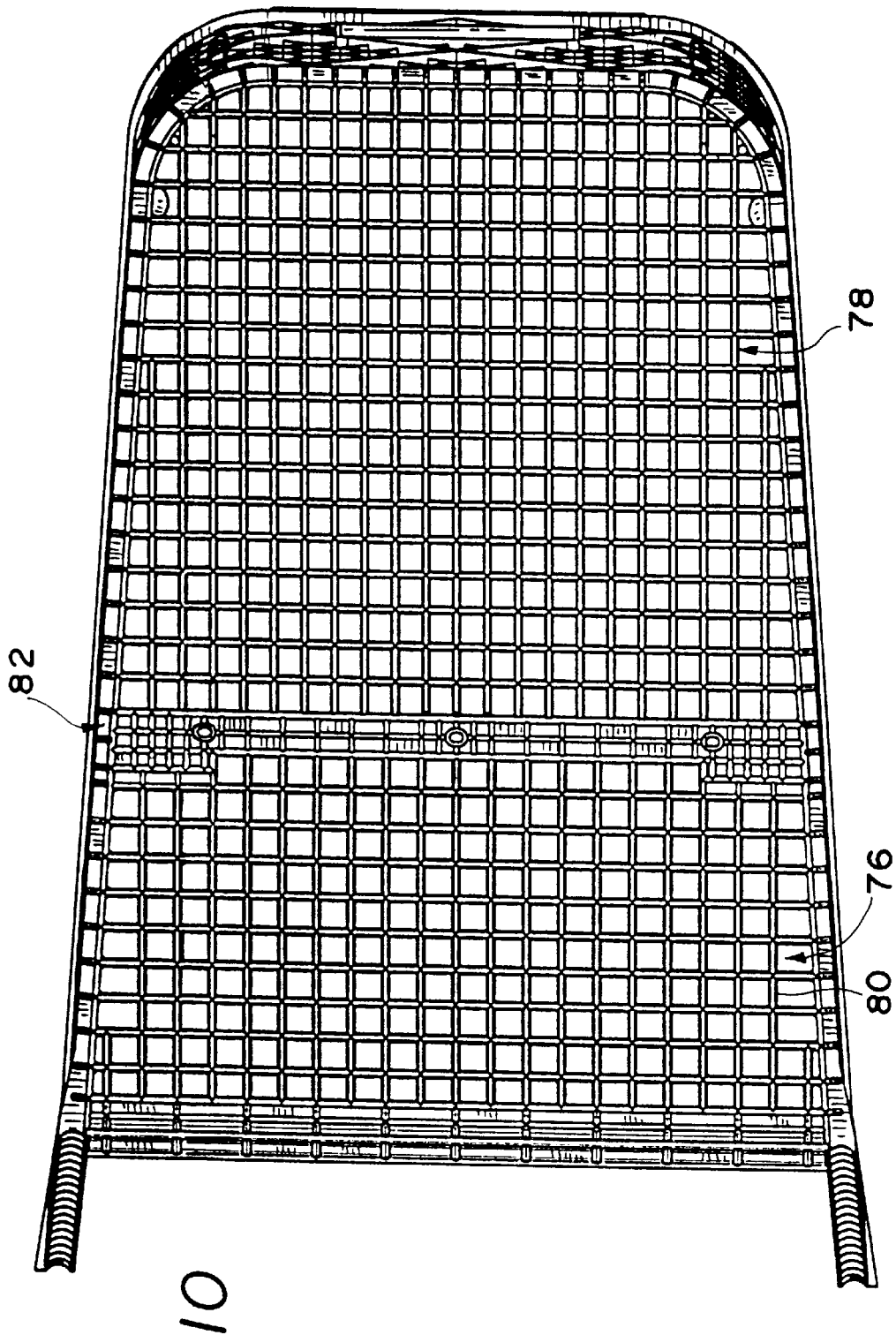
FIG. 10 is a bottom plan view of the molded plastic shopping basket shown in FIG. 1.

In FIG. 7 there is depicted schematically a molding arrangement illustrating how the gridwork of the basket side and front walls is formed in a one-shot molding procedure. The bottom of the basket, which also is constructed as a gridwork as shown in FIGS. 9 and 10, is also molded simultaneously with the side and front walls but the mold used to form the bottom of the basket is not described here.

The gridwork ribs 40 of the side wall are formed between an inner core mold section 66 shown in dotted lines and outer mold section 68 that is moveable transversely in a direction indicated by arrows 70 towards and away from the inner section 66 by conventional mold machinery that is not herein described. The direction of motion 70 of the outer mold section 68 that creates mold cavities for the gridwork forming the side of the basket is established by the mold machinery, but it will be apparent that the mold outer section 68 must be freely moveable or releasable from the molded plastic gridwork forming the side of the basket without substantial distortion of the gridwork.

To facilitate the release of the mold section 68, the major axes of the ribs 40 forming the side wall of the basket all extend parallel to each other and in a direction parallel to the direction of motion 70 of outer mold section 68. The major axes of the end rib 44 extends in the same direction as the direction of motion 70 of outer mold section 68 while the parting line rib 20 extends along a radius line r that extends from the center of curvature of the curved end section 32 of the side wall 14.

An outer mold section 72 moveable generally parallel to the longitudinal direction of the basket in a direction indicated by arrow 74 is used to form the gridwork ribs 42 of the front wall by cooperating with the inner mold section 66. It will be noted that, in a preferred embodiment, the directions of movement of the mold sections 68,72 as indicated by arrows 70 and 74 are generally perpendicular to each other. The direction of motion 74 of the outer mold section 72 extends parallel to the direction of the major axes of the gridwork ribs 42 and the end ribs 46 of the front wall 16, and the major axes of these ribs extend parallel to each other.

The end ribs 44 of the side walls 12,14 are formed by the outer mold sections 68, one of which is illustrated in FIG. 7, the other mold section used to form the side wall 12 being omitted for clarity.

The mold parting line 18 defines the juncture between moveable outer mold sections 68,72 when they are moved fully towards inner mold section 66 to define the mold cavities used to form the gridwork of the side walls and the front wall of the basket. It will be noted that the parting line rib 20 is formed by both outer mold sections 68,72 along the parting line 18 when the outer mold sections are moved fully inward in cooperation with the inner mold section 66. The mold parting line 18 is located midway (about 45°) along the curved sections between the end ribs 44,46 of the side walls and front wall, respectively in a preferred embodiment of the invention.

Figure 11:
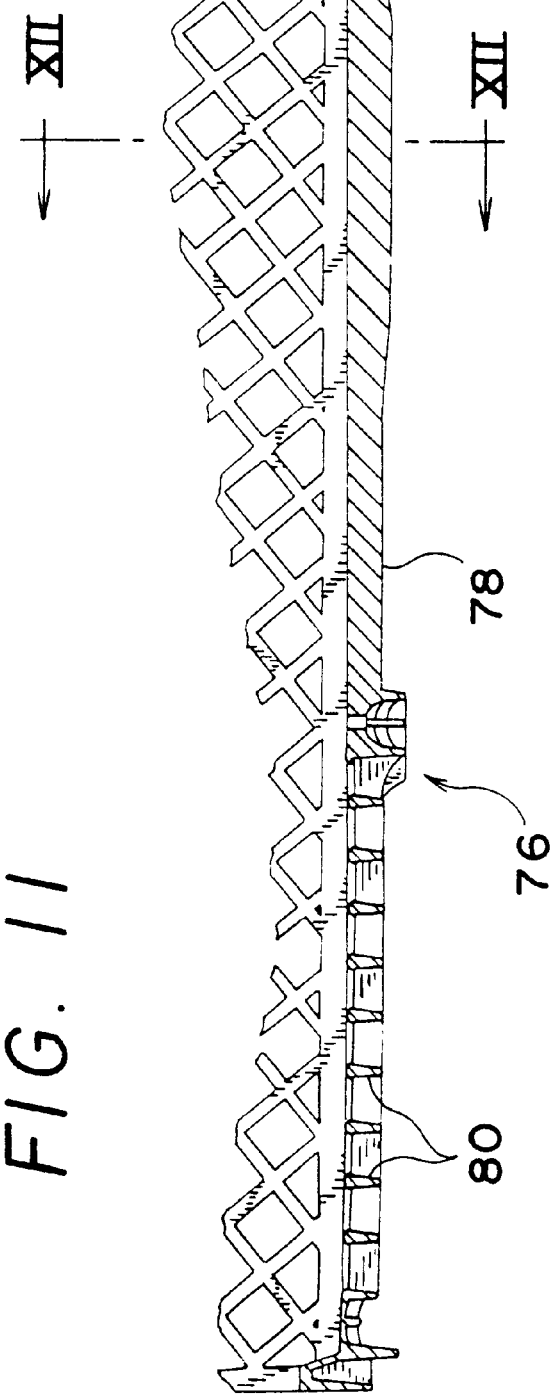
FIG. 11 is a vertical section view taken along line XI—XI in FIG. 9.
Figure 12:
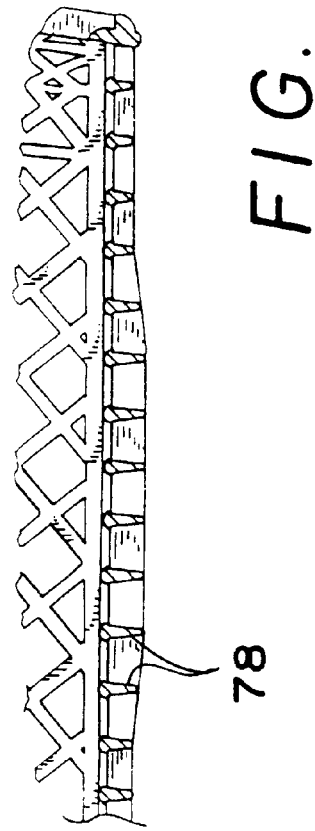
FIG. 12 is a vertical section view taken along line XII—XII in FIG. 11.

The basket in a preferred embodiment will include an integrally molded bottom wall 76 (see FIGS. 9 and 10) that intersects the lower edges of the side and front walls 12,14 along the entire lengths of the walls. The bottom wall 76 is formed of a gridwork of longitudinal and transverse ribs 78,80 located towards the forward and rear sections of the basket 10, respectively. It will be noted that the longitudinal ribs 78 forming the gridwork of the mid-forward portion of the bottom wall 76 have a great height over a portion of their lengths to provide reinforcement for the basket bottom in the mid-forward section of the bottom wall 76, as shown in FIGS. 11 and 12. The inner edges of the ribs 78,80 effectively define the inner side of the bottom wall 76, while the tips of the ribs 78,80 effectively define the outer surface of the bottom wall 76.

As evident from FIGS. 11 and 12, the inner edges of the ribs 78,80 may be rounded instead of planar for aesthetic reasons and to avoid build up of dirt or spillage on the bottom of the basket. The round inner edges also permit easy, safe sliding of products along the bottom of the basket.

The bottom wall also includes an integrally molded reinforced area 82 extending transversely across the bottom of the bottom wall, the reinforced area being adapted to receive a cross member of the chassis on which the basket will be mounted when it is assembled as a shopping cart.

Figure 17:
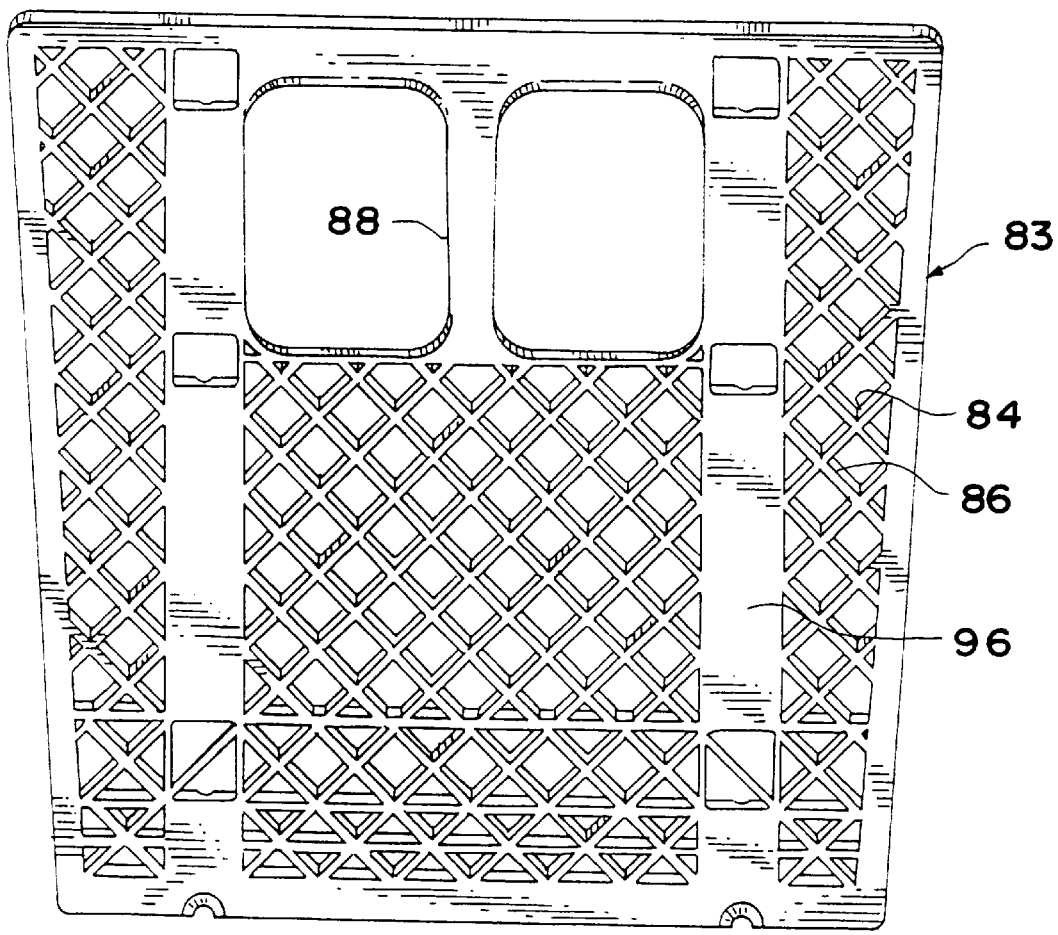
FIG. 17 is a front elevation view of the rear panel shown in FIG. 13.

A rear panel 83 for the basket 10 is illustrated in FIG. 13 and this rear panel may be molded at the same time as and in the same mold used to form the basket 10 or may be molded separately. The rear panel 83 forms a hinged rear closure for the basket 10 when it is fully assembled on a shopping cart chassis in a known manner to enable nesting of the shopping cart with other similar carts. The rear panel 83, like the side and front walls 12,14 and 16, is constituted of a gridwork of ribs 84 having inner edges effectively defining the inner wall of the rear panel and outer tips effectively defining the outer wall of the panel. FIG. 13 shows the rear panel from the outside, while FIG. 17 shows the opposite side of the panel 83 as it appears on the inside of the basket when assembled on the cart chassis. The inner edges 86 of the ribs 84 are generally planar like the inner edges of the ribs forming the side and front walls of the basket. The outer tips of the ribs 84 may be tapered so they conform generally to the gridwork of the side and front walls of the basket. The ribs 84, like the ribs of the gridwork forming the side walls and front wall of the basket extend at an angle of approximately 45° to the upright direction of the basket 10 so that they appear to form a continuation of the gridwork ribs forming the side walls of the basket.

As is conventional, the rear panel 82 includes openings 88 to accommodate the legs of an infant sitting in an infant seat that is normally provided on the inner side of the rear panel 83.

The gridwork forming the rear panel 83 includes generally upright extending sections 90,92 that are indented to accommodate a portion of the shopping cart chassis that will be utilized to support and hinge the rear panel 83. Generally upright extending ribs 94 are also utilized to provide further reinforcement of the gridwork on either side of the sections 90,92. A portion of the gridwork may be closed by plastic material as shown at 96 between the reinforcing ribs 94.

It will be appreciated that the preferred embodiment of the invention has been described herein for illustrative purposes only; that persons skilled in the art may create different forms of the invention within the scope of the invention; and that the scope of the invention extends to the full scope of the claims appended hereto.

What is claimed is:

1. A basket for a shopping cart comprising:
   upright longitudinally extending opposed side walls of molded plastic material integrally joined by molding to opposed ends of a transversely extending upright front wall of molded plastic material along upright mold parting lines;
   said side and front walls formed of a gridwork of periodically spaced, mutually perpendicular intersecting gridwork ribs extending lengthwise in a non-upright direction relative to the upright direction of the side walls and front wall, and heightwise generally perpendicular to said side and front walls;
   said side walls each including a planar section terminating at a respective one of said parting lines at a convex circular curved front end section;
   the front wall having a planar central section and opposed convex circular curved end sections terminating at a respective parting line;
   said gridwork ribs each having a generally trapezoidal shape in cross-section, including a generally planar inner edge having a given width; an outer tip spaced heightwise from the inner edge and extending across a shorter width dimension than said inner edge, and laterally spaced, converging, generally planar rib side walls extending heightwise between said inner edge and said tip;
   said gridwork rib inner edges collectively forming the inner surfaces of said side and front walls, and said gridwork rib tips collectively forming the outer surfaces of said side and front walls;
   at least the tips of said gridwork ribs of the curved end sections of he front and side walls intersecting each other along said parting lines;
   said gridwork ribs in cross-section each including a major height axis extending heightwise between the inner edge and outer tip;
   said gridwork ribs each having a uniform inner edge width throughout their lengths;
   the major height axes of the gridwork ribs of the front wall all extending parallel to each other;
   the major height axes of the gridwork ribs of the opposed side walls all extending parallel to each other and perpendicular to the major height axes of the gridwork ribs of the front wall throughout the respective lengths of the gridwork ribs.

2. The basket according to claim 1, wherein the curvature and arc lengths of the circular curved front end sections of said side walls and the circular curved end sections of said front wall are equal.

3. The basket according to claim 1, wherein the length of the major height axis of at least one gridwork rib of said side and front walls is of greater length than the length of the major height axis of another gridwork rib of said front and side wall in the planar sections of said front and side walls, and wherein the lengths of the major height axes of all gridwork ribs of front and the curved end sections of the side walls are equal at their intersections with said parting lines.

4. The basket according to claim 3, wherein the length of the major eight axis of said at least one gridwork rib that is of greater length gradually and smoothly changes to reach a length corresponding to the length of the major height axes of the other gridwork ribs as each gridwork rib having a major height axis of greater length approaches each parting line in the curved end sections of said front and side walls.

5. The basket according to claim 3, including a plurality of gridwork ribs having a major height axis length greater than the major height axis length of the other gridwork ribs, and wherein said plurality of gridwork ribs having a greater height axis length are symmetrically spaced at periodic intervals across said side and front walls.

6. The basket according to claim 5, wherein the length of the major height axes of said gridwork ribs that are of greater length gradually and smoothly change to reach a length corresponding to the length of the major height axes of the other gridwork ribs as each gridwork rib having a major height axis of greater length approaches each parting line in the curved end sections of said front and side walls.

7. The basket according to claim 1, including an additional upright extending mold parting line rib extending along each mold parting line, said gridwork ribs of the curved end sections of said front and side walls intersecting said parting line ribs.

8. The basket according to claim 7, including an upright extending end rib located on each side and front wall at the intersection of the planar sections of each respective wall and the convex curved end sections of each wall, said gridwork ribs of said planar and convex curved end sections of said front and side walls intersecting said end ribs in a manner that creates the visual effect that the gridwork ribs extend continuously through said end ribs.

9. The basket according to claim 8, wherein said parting line and end ribs generally conform in cross section configuration with said gridwork ribs.

10. The basket according to claim 1, wherein said mold parting line is located approximately at the mid point along the curvature defined by the curved end sections of intersecting front and side walls.

11. The basket according to claim 1, wherein the gridwork ribs of the front and side walls extend at approximately 45° relative to the upright direction of the basket.

12. The basket according to claim 1, including a molded plastic bottom ball connected to and spanning the area between the front and side walls, said bottom wall integrally connected as a single continuous molded part to and spanning the area between the bottom edges of said front and side walls, and comprising longitudinal and transverse upstanding intersecting ribs forming a grid work extending substantially over the entire bottom wall.

13. The basket according to claim 12, wherein the longitudinal and transverse ribs are tapered between inner and outer edges and include rounded inner edges defining a bottom surface of the bottom wall.

14. The basket according to claim 12, said bottom wall including a transversely extending reinforcement structure integrally molded as a single piece with the bottom wall for cooperating with a transverse cross member used to mount the basket on a chassis.

15. A basket according to claim 1, including a separate rear panel geometrically shaped to fit between the side walls at their ends opposite the front wall, said rear panel comprising a one-piece molded plastic panel configured as a grid work of intersecting ribs tapered between inner and outer ends, said ribs corresponding in overall appearance to the grid work ribs of said front and side walls.

16. The basket according to claim 15, said rear panel including integrally molded reinforcement portions wherein the grid work is at least partly closed by molded plastic material.

* * * * *